United States Patent Office 3,528,119
Patented Sept. 15, 1970

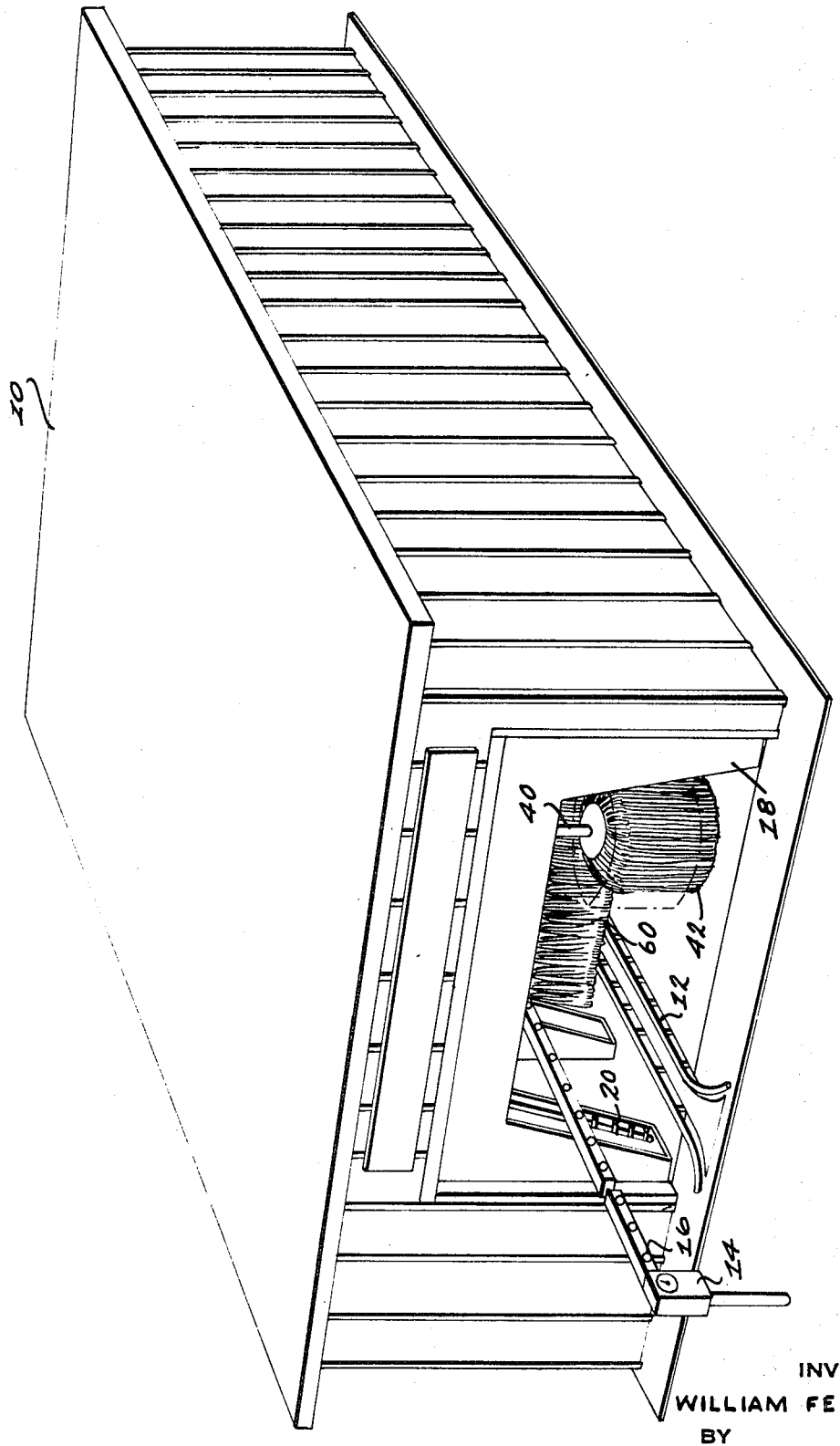

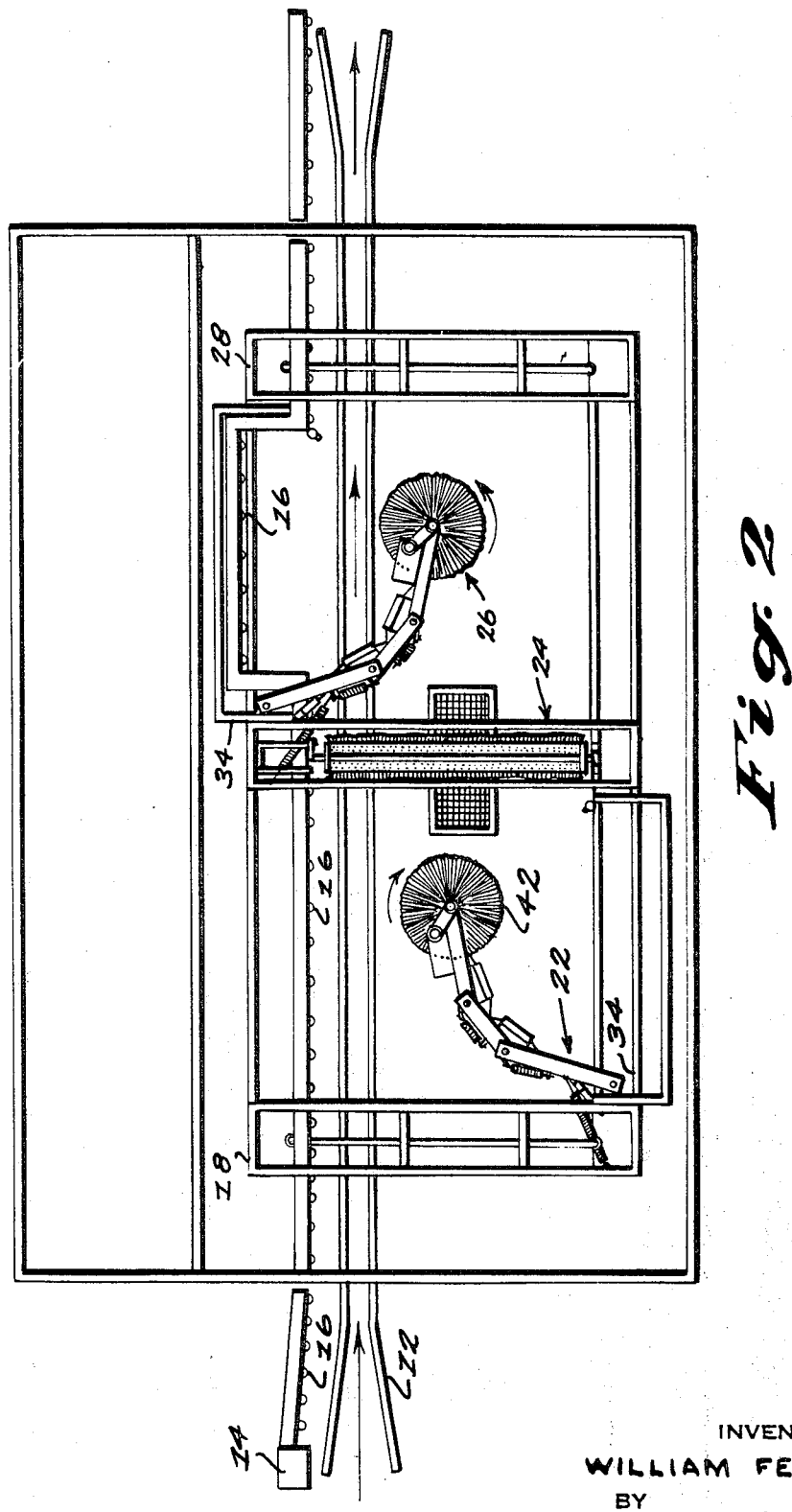

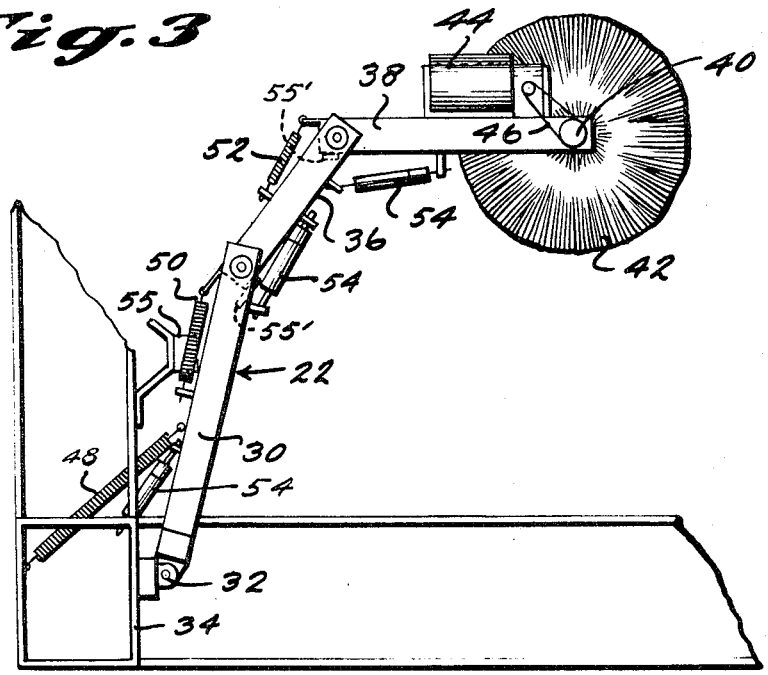
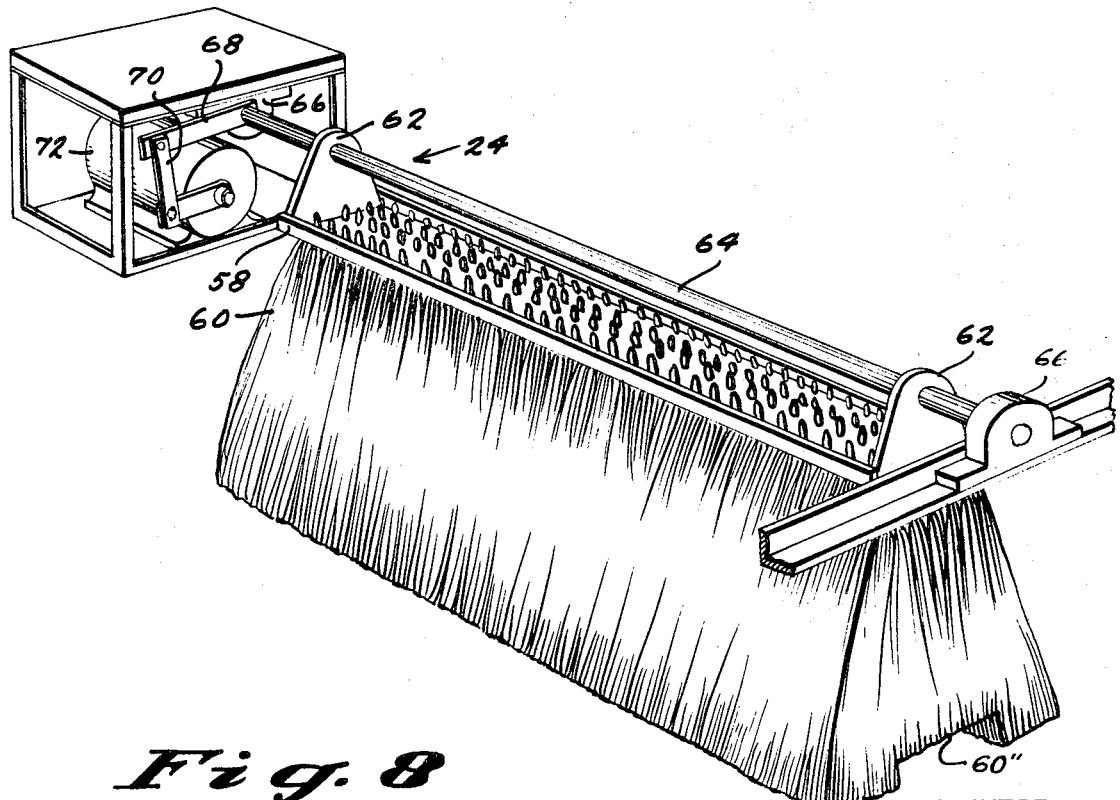

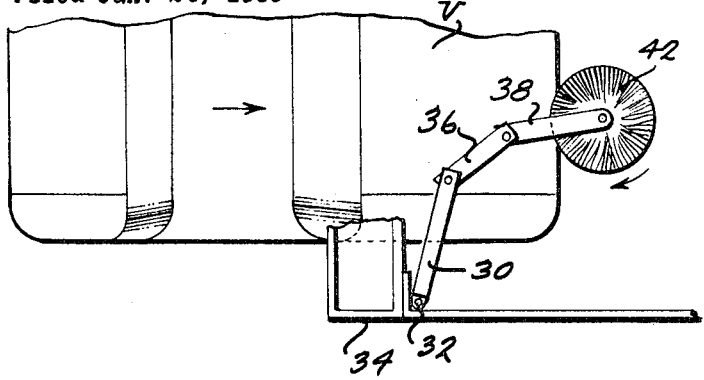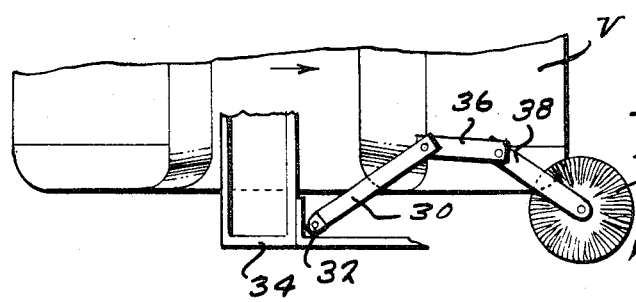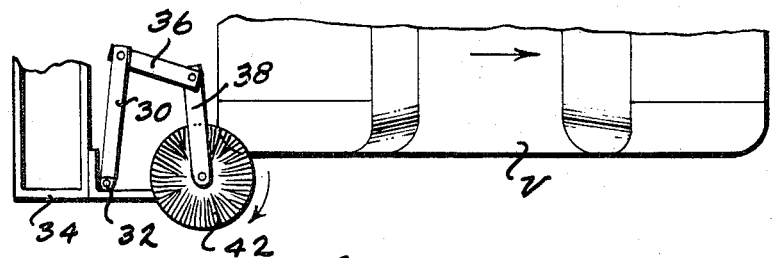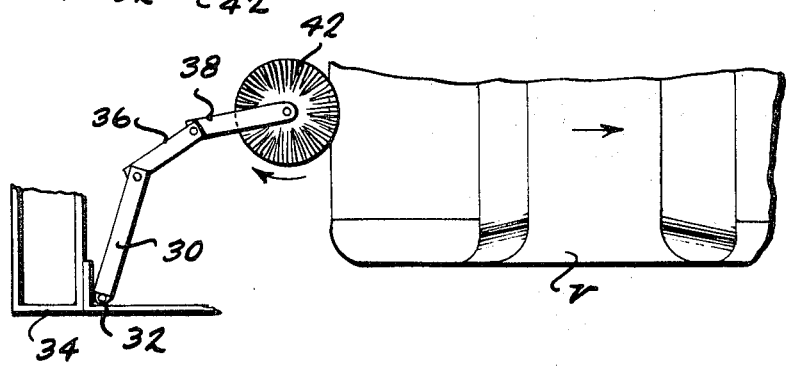

3,528,119
BRUSH MEANS FOR VEHICLE CLEANING
APPARATUS
William Fergerson, Dallas, N.C., assignor to Associated Sales Enterprises Inc., Kings Mountain, N.C., a corporation of North Carolina
Filed Jan. 24, 1968, Ser. No. 700,145
Int. Cl. B60s 3/06
U.S. Cl. 15—21                                                14 Claims

ABSTRACT OF THE DISCLOSURE

Brush means for cleaning vehicles as they advance through a washing apparatus, which brush means includes a pair of spaced complementary brush assemblies, each having a rotating brush element carried by a support linkage that permits movement of the brush element along part of the front and rear of the vehicle and along one side thereof. The support linkage includes at least two links, one of which provides a component of movement to the brush element across the rear of the vehicle in an arc generally transverse to the direction of vehicle advance and the other of which simultaneously provides a component of brush element movement in an arc initially following generally the direction of vehicle advance and ultimately generally transverse to the direction of vehicle advance. An additional brush assembly may be provided between the assemblies of the aforementioned pair, which additional assembly includes vertically hanging strands supported for movement back and forth across the upper surface of the vehicle in a path generally parallel to the direction of vehicle advance.

BACKGROUND OF THE INVENTION

Apparatus for washing vehicles generally includes a series of cleaning stations through which a vehicle is advanced, with each station being equipped to clean a particular surface portion of the vehicle.

The vertical surface portions of the vehicle (i.e., the front, sides and rear of the vehicle) are usually cleaned at a pair of cleaning stations spaced along, and on opposite sides of, the path of vehicle advance. Each of these stations includes a rotating brush element mounted for movement relative to the advancing vehicle and biased into contact therewith to remove dirt and other foreign matter therefrom. However, because of the relatively large size and weight of these brush elements and the fact that the vehicle is continuously advancing, difficulty has been encountered in moving the brush elements in a manner which insures their maintaining continuous cleaning contact with the vehicle, particularly at the rear corners of the vehicle and along the rear of the vehicle as it advances away from the brush elements.

Heretofore, brush members of this type have been held in contact with the vehicle by movable support arrangements which fall into two general categories, one type being a relatively simple spring-operated linkage which requires no external power actuation but which is particularly susceptible to the aforementioned difficulty of maintaining the brush element in contact with the vehicle at the corners and rear end thereof as it has only one link member providing an effective component of brush movement transverse to the direction of vehicle advance for cleaning the rear of the advancing vehicle, a typical disclosure of this type being U.S. Pat. No. 3,350,733, issued Nov. 7, 1967, and the other type being a relatively complex system which systematically conducts the brush member through a prescribed cycle using intermittently operated power sources, such as hydraulic motors, a typical disclosure of this latter type being U.S. Pat. No. 3,310,824, issued Mar. 28, 1967. Moreover, in this latter arrangement, as in the first arrangement, only one link member provides an effective component of brush movement transverse to the direction of vehicle advance for cleaning the rear of the advancing vehicle. Further, this link member undesirably imparts a component of movement opposite to the direction of vehicle advance, thereby making it necessary for the other link member to compensate for this movement to maintain the brush element in contact with the rear of the advancing vehicle.

Additionally, equipment presently available for cleaning the upper, generally horizontal surfaces of the vehicle (i.e., the hood, top and trunk of the vehicle) has likewise been found either to be very cumbersome and complex, or susceptible to passing over areas of the vehicle without maintaining sufficient contact therewith to clean it properly.

SUMMARY OF THE INVENTION

The present invention provides vehicle washing apparatus that includes rotating brush assemblies arranged to clean the vertical surface of the vehicle and mounted on pivoted support linkages which are extremely simple to manufacture and operate, and which provide a unique brush member movement that insures constant contact thereof with the advancing vehicle even at the previously mentioned areas where difficulty has been heretofore encountered. Moreover, the present invention provides an additional brush assembly for cleaning the horizontal surfaces of the vehicle in a unique manner which results in an increased amount of surface contact between the brush member and the vehicle not only at areas which are relatively inaccessible to the brushing action, but also at the entire surface area of the vehicle which this brush element is designed to clean.

The vertical surface cleaning brush assembly of the present invention includes a support linkage having a link member providing a component of brush element movement in an arc generally transverse to the direction of vehicle advance and the other of the link members providing a component of brush element movement in an arc initially following generally the direction of vehicle advance and ultimately generally transverse to the direction of vehicle advance; these two components of brush element movement combining to maintain cleaning contact across at least a portion of the rear of the advancing vehicle. Thus, an initial component of the brush element movement insures proper contact thereof with the rear corner of the vehicle, and both link members and a component of movement to the brush element transverse to the path of vehicle advance to sweep the brush element across the rear of the advancing vehicle.

Preferably, the support linkage initially positions the rotating brush element in the path of advance of the vehicle substantially at the center thereof and allows the brush element to move transversely across the front end of the vehicle in response to the advance thereof, then maintains the brush element in contact with the side of the vehicle while utilizing the reaction of the rotating brush element against the side of the vehicle to move the support linkage to a cocked position, and then moves to an uncocked disposition to advance the brush element in cleaning contact across the rear of the advancing vehicle as aforementioned. Moreover, in the preferred embodiment of the present invention, the support linkage for the brush element is actuated solely by spring elements interconnecting the several link members which make up the support linkage, and therefore no external power source or control system is required. This use of spring elements to actuate the several link members provides an enhanced and more reliable cocking action as less reactive force is necessary to effect cocking than would be the case with a single link and a single spring element of sufficient strength to effect a cleaning action movement by itself.

Preferably, a pair of such brush assemblies are arranged in spaced relation and disposed on opposite sides of the apparatus for combined cleaning of the entire front, rear and side surfaces of the vehicle.

The horizontal or upper surface cleaning brush assembly of the present invention, which in the preferred embodiment is located between the spaced vertical surface cleaning brush assemblies, comprises a plurality of elongated flexible brushing strands hanging into the path of an advancing vehicle and mounted for movement back and fourth in a path generally parallel to the path of vehicle advance. As these brushing strands are arranged for back and forth movement parallel to the path of vehicle advance, they do not interfere with attachments on the vehicle, such as radio aerials, and they advantageously provide a supplemental cleaning action on upper portions of the vertical surfaces of the vehicle, such as at the side windows. In the preferred embodiment, these brushing strands are carried by a frame member supported above the advancing vehicle on a shaft member arranged for oscillation about an axis transverse to the direction of vehicle advance.

The combined effect of the vertical surface cleaning brush assemblies and the horizontal surface cleaning brush assembly results in a vehicle cleaning operation that realizes substantial advantages over the prior art because of its simplicity and the thorough manner by which it cleans vehicles.

DESCRIPTION OF THE DRAWINGS

FIG. 1 is a perspective view of an automatic vehicle washing apparatus incorporating the improved features of the present invention;

FIG. 2 is a plan view of this apparatus of FIG. 1 with the roof structure removed to illustrate the several cleaning stations;

FIG. 3 is an enlarged plan view of the apparatus of FIG. 1;

FIGS. 4 to 7 are related schematic views illustrating the movements of the vertical surface cleaning brush assembly as a vehicle advances thereby; and FIG. 8 is a perspective view of the horizontal surface cleaning brush assembly of the apparatus of FIG. 1.

DESCRIPTION OF THE PREFERRED EMBODIMENT

Referring now in detail to the drawings, FIG. 1 illustrates a building structure 10 enclosing an apparatus for automatically cleaning vehicles. Located at the entranceway of the building structure 10 is a guide channel 12 into which the operator of the vehicle to be washed drives the left front tire of the vehicle for guiding it through the cleaning operation, and a coin box 14 supported at the end of a bank of indicator light 16 that are programmed to light in timed sequence when energized by the coin box 14 and thereby provides a visual guide to be followed by the operator of the vehicle in advancing the vehicle through the plurality of cleaning stations located in spaced relation along the path of vehicle advance.

As the vehicle advances through the entranceway of building structure 10, it first passes through an arch 18 presenting a large number of inwardly directed jets 20 through which a mixture of water and detergent issues under a relatively high pressure so as to thoroughly cover and initiate cleaning of the vehicle with the mixture, and then the front of the vehicle contacts a right side brush assembly 22 which cleans one half of the front and rear ends of the vehicle and the entire right side thereof in a manner to be explained in further detail presently. Next, the vehicle passes through an upper surface cleaning brush assembly 24 that cleans the horizontal surfaces of the vehicle, continues past a left side brush assembly 26 which cleans the portion of the vertical surfaces not cleaned by brush assembly 22, and passes finally through a rinsing arch 28 where clear water is directed against all surfaces of the vehicle to remove residual detergent. If desired, the water issuing from rinsing arch 28 may have a quantity of wax entrained therewith which remains on the vehicle to provide a protective coating therefor.

Since right side brush assembly 22 and left side brush assembly 26 operate in the same manner to clean, respectively, the right and left sides of the vehicle, a detailed description of one of the brush assemblies will serve to explain the structure and operation of both. As best seen in FIG. 3, the right side brush assembly 22 comprises a carrier link member 30 supported at one of its ends for pivotal movement about a stationary pivot 32 secured to frame 34 and pivotally supporting at its other end a first pivot link member 36 which, in turn, supports at its other end a second pivot link member 38. The extending end of second pivot link member 38 rotatably supports a vertically disposed shaft member 40 on which is mounted a brush element 42 comprised of relatively long flexible cleaning strands which hang generally downward on top of each other when the brush element 42 is not rotating, as seen in full lines in FIG. 1, but which assume an outstanding cylindrical shape when the brush element 42 is rotated, as seen in dotted lines in FIG. 1. Shaft member 40 is rotated in a clockwise direction as seen in FIG. 3 by an electric motor 44 through a chain drive 46, the electric motor 44 being supported on second pivot link member 38.

A resilient spring element 48 extends between frame 34 and carrier link member 30 for yieldably maintaining the latter at a position extending generally transverse to the direction of vehicle advance (see FIGS. 2 and 3), and first and second pivot link members 36, 38 are respectively maintained in a generally extended position with respect to carrier link 30 by a resilient spring 50 connected between the pivoted end of first pivot link member 36 and carrier link 30 and by a resilient spring 52 connected between the pivoted end of second pivot link member 38 and first pivot link member 36. Carrier link 30 and first and second pivot link members 36, 38 also are provided respectively with shock absorbers 54 which cushion the movement of their link members as they reach this limit. To stop the motion of links 30, 36 and 38 under the influence of their respective springs, a stop element 55 secured to frame 34 for abutment with link 30, and stops 55' are provided on links 30 and 36 for abutment with links 36 and 38, respectively.

With the various elements of the right side brush assembly 22 arranged in the aforementioned manner, the operation of these elements in maintaining the brush element 42 in contact with a vehicle advancing thereby is illustrated in FIGS. 4 to 7. In FIG. 4, carrier link member 30 and first and second pivot link members 36, 38 are in a static condition positioning the brush element 42 in the path of vehicle advance substantially at the center thereof, the brush element 42 rotating in a clockwise direction. When the vehicle V comes into contact with the rotating brush element 42, the foreward motion of the vehicle V and the rotational contact between the brush element 42 and the front of the vehicle V cause the brush element 42 to move along the front of the vehicle V in cleaning contact therewith, this movement being permitted by the pivot movement of carrier link member 30 against the bias of spring 48 (FIG. 3) about pivot point 32 in an arc generally parallel to the direction of vehicle advance while the first and second pivot link members 36, 38 remain substantially in the same relative position with respect to each other and to carrier link member 30. When the brush element 42 reaches the right front corner of the vehicle V, as seen in FIG. 5, and begins to pass down the right side of the vehicle V, the brush element 42 is initially held in cleaning contact with the vehicle primarily by the bias of spring 48 acting on carrier link 30. However, the brush element 42, by virtue of its clockwise rotation, tends to "roll" along the side of the vehicle V and thereby exerts a reactive force at this extending end of second pivot member 38 in a direction opposite to the direction of vehicle advance as indicated by arrow 56 in FIG. 5. This reactive force acts to return carrier link 30 to its initial FIG. 4. position and, in addition, causes first pivot link member 36 and second pivot link member 38 to pivot about their respective pivot points against the bias of springs 50 and 52 to a cocked disposition as illustrated in FIG. 6, the springs 50 and 52 then acting to maintain the brush element 42 in cleaning contact with the vehicle V. When first and second pivot link members 36, 38 are in this cocked disposition, first pivot link member 36 extends from a pivot point (at the extending end of carrier link member 30) lying above the path of vehicle advance in the general direction of vehicle advance, and second pivot link member 38 extends from a pivot point (at the extending end of first pivot link member 36) lying above the path of vehicle advance in a direction generally transverse to the direction of vehicle advance.

When the brush element 42 reaches the rear corner of the advancing vehicle V, the first and second pivot link members 36, 38 begin to move from their cocked disposition (FIG. 6) and return ot their original static disposition (FIG. 7), this movement being caused by springs 50 and 52. By comparing FIGS. 6 and 7, it will be seen that during this movement the extending end of first pivot link member 36 travels in an arc generally transverse to the direction of vehicle advance so as to provide a corresponding component of movement to the brush element 42, and the extending end of second pivot link member 38 moves in an arc initially following the direction of vehicle advance and ultimately generally transverse to the direction of vehicle advance so as to provide a corresponding component of movement to the brush element 42, these two components of movement imparted to brush element 42 serving to maintain it in cleaning contact with the rear of the advancing vehicle V from the right rear corner to at least slightly past the center of the vehicle. When the movement of first and second pivot link members 36, 38 is arrested by absorbers 54, the brush element 42 is at its original position, ready to clean the next vehicle.

It will be noted that a the rear corner of the vehicle theretofore difficulty has been encountered in maintaining the brush element in cleaning contact with the vehicle, as previously described, a substantial component of movement is imparted to the brush element 42 in the direction of vehicle advance so as to insure proper cleaning contact between the brush element 42 and the vehicle V. Likewise, where difficulty had been previously encountered in sweeping the brush element across the rear of the vehicle before it advanced to a point where it would leave the brush element, the present invention provides an arrangement by which both the first and second link members 36, 38 are moving in the same pivotal direction and imparting corresponding components of movement to the brush element 42 in a direction transverse to the direction of vehicle advance and toward the center of the vehicle V whereby the brush element 42 reaches the center of the vehicle V before the vehicle V advances to a point of separation.

The left side brush assembly 26 operates in the same manner as right side brush assembly 24 to clean the left half of the front and rear of the vehicle V and the entire left side thereof, it being noted that the brush element of the left side brush assembly 26 must rotate in a direction opposite to that of the right side brush assembly 22 because of its location on the opposite side of the path of vehicle advance.

The previously mentioned upper surface cleaning brush assembly 24 is best illustrated in FIG. 8 and comprises a frame member 58 supporting a plurality of elongated flexible brushing strands 60 formed from a suitable brushing material and arranged to hang vertically from the frame member 58 into the path of vehicle advance, preferably well below the level of the vehicle hood, so as to contact the upper surfaces of the vehicle V as it advances beneath the frame member 58. The upper ends of brushing strands 60 are fixed in the frame member 58 in a plurality of adjacent transverse rows with the strands 60" in the innermost rows having a hanging length that is shorter than the corresponding length of strands 60' in the outermost rows so as to provide an improved cleaning action as the strands are moved across the surfaces of varying heights of the moving vehicle. In the preferred embodiment of the present invention, the brushing strands 60 are arranged in four rows as seen in FIG. 8 with the strands 60' of the two outer rows having a length of 46 inches and the strands 60" of the two center rows having a length of 40 inches.

The frame member 58 includes a pair of upwardly directed flanges 62 that are fixed to a shaft member 64 extending horizontally and transversely of the direction of vehicle advance (FIG. 2), the shaft member being journaled at each end thereof in suitable stationary bearings 66. One end of the shaft member 64 has an arm member 68 extending radially therefrom, and this arm member 68 is connected to a linkage 70 that is driven by an electric motor 72 to cause oscillation of the arm member 68 and the shaft member 64. This oscillation of shaft member 64 about the horizontal axis thereof imparts a corresponding oscillation to the frame member 58 and the brushing strands 60 whereby the latter move back and forth across the upper surface of the vehicle V in a path generally parallel to the path of vehicle advance.

It is to be understood that while the oscillating motion imparted to the brushing strands 60 is the preferred manner of moving them back and forth across the vehicle in a direction parallel to the direction of vehicle advance, it is also within the scope of the present invention to move them horizontally in such direction as, for example, by mounting frame member 58 for horizontal reciprocal movement rather than oscillatory movement.

The present invention is not intended to be limited by this description or otherwise except as defined in the appended claims.

I claim:

1. In an apparatus for washing vehicles, a brush assembly for cleaning a surface portion of a vehicle advancing through the apparatus, said brush assembly comprising a first link member pivotally supported at one end from said apparatus, a second link member pivotally supported at one end from the other end of said first link member, a brush element supported at the other end of said second link member in vehicle contacting disposition, means for moving one of said link members to provide a component of brush element movement across the rear of said vehicle in an arc generally transverse to the direction of vehicle advance, and means for moving the other of said link members to provide a component of brush element movement across the rear of said vehicle in an arc initially following generally the direction of vehicle advance and ultimately generally transverse to the direction of vehicle advance, said components of brush element movement combining to provide movement of said brush element in cleaning contact across at least a portion of the rear of a vehicle as it advances past said brush assembly.

2. In an apparatus for washing vehicles, a brush assembly according to claim 1 and further characterized in that said first link member is pivotally supported at one end thereof about a point lying above the path of vehicle advance.

3. In an apparatus for washing vehicles, a brush assembly according to claim 1 and characterized further by a carrier link member pivotally supported at one of its ends from said apparatus and forming at its other end said pivoted support of said first link member, said carrier link member being disposed generally transverse to the direction of vehicle advance for movement in an arc generally parallel to the direction of vehicle advance.

4. In an apparatus for washing vehicles, a brush assembly according to claim 3 and characterized further in that said brush element is disposed in an initial position in the path of the front of the advancing vehicle, in that said carrier link member permits said brush element to move forward with the vehicle front and across said vehicle front to one side thereof upon brush element contact with the vehicle front, and by means causing said brush element to move in cleaning contact along said vehicle side while cocking said link members for subsequent action of each of said link member moving means to move said brush element in cleaning contact across said vehicle rear to said initial brush position.

5. In an apparatus for washing vehicles, a brush assembly according to claim 1 and characterized further in that said ultimately generally transverse component of brush element movement provide by said means for moving said other link member is in the same transverse direction as said component of brush element movement provided by said means for moving said one link member.

6. In an apparatus for washing vehicles, a brush assembly according to claim 1 and characterized further in that said link members are disposed to position said brush element in cleaning contact with one side of the advancing vehicle prior to the rear cleaning brush element movement, and said portion of the vehicle rear contacted by said brush element includes and extends from the edge of the vehicle rear at said one side of the advancing vehicle.

7. In an apparatus for washing vehicles, a brush assembly according to claim 6 and characterized further in that said means for moving said first link member and said means for moving said second link member are resilient biasing means acting on said link members to bias said brush element in cleaning contact with the vehicle side and to move said link members in said arcs to bias said brush element in said cleaning contact with the vehicle rear.

8. In an apparatus for washing vehicles, a brush assembly according to claim 7 and characterized further in that said brush element is disposed in an initial position prior to vehicle contact in the path of the front of the advancing vehicle, in that said brush element is supported for rotation about a generally vertical axis, and by means for rotating said brush element in a direction causing the brush element to move by frictional contact with the vehicle across the front thereof to said one side and rearwardly along said side to cock said link members against the biasing of said resilient biasing means for subsequent uncocking movement in said arcs across said vehicle rear to said initial brush element position.

9. In an apparatus for washing vehicles, a brush assembly according to claim 8 and characterized further by a carrier link member pivotally supported at one of its ends by said apparatus and forming at the other of its ends said pivotal support of said first link member, said carrier link member being disposed to permit forward movement of said brush element with the vehicle front as said brush element moves thereacross.

10. In an apparatus for washing vehicles, a brush assembly for cleaning the surface of a vehicle advancing through the apparatus, said brush assembly comprising a first link member pivotally supported at one end thereof and extending in the general direction of vehicle advance for movement of the other end in an arc generally transverse to the direction of vehicle advance, a second link member pivotally supported at one end from said first link member other end and extending therefrom for permitting movement of the other end of said second link member in an arc initially following generally the direction of vehicle advance and ultimately generally transverse to the direction of vehicle advance, a brush element supported at said second link member other end in vehicle contacting disposition, means for moving said first and second link members through their respective arcs when said brush element reaches the rear of said vehicle thereby to maintain said brush element in cleaning contact with the rear of a vehicle as the vehicle advances past said brush assembly.

11. In an apparatus for washing vehicles, a brush assembly according to claim 10 and characterized further in that said arc of said second link member other end extends from one side edge of the vehicle rear inwardly therefrom, and in that said means for moving said first and second link members moves said link members in the same pivotal direction.

12. In an apparatus for washing vehicles, a brush assembly according to claim 11 and characterized further in that said first link member is disposed above the path of vehicle advance and extends in the general direction of vehicle advance when said brush element reaches the rear of said vehicle, and in that said second link member extends from said first link member other end for movement by said second link member moving means from a generally transverse disposition to a disposition in the general direction of vehicle advance.

13. In an apparatus for washing vehicles, a brush assembly according to claim 12 and characterized further by a carrier link member pivotally supported at one end from said apparatus and forming at its other end said pivotal support of said first link member, said carrier link member extending generally transverse to the direction of vehicle advance when said brush element reaches the rear of said vehicle for movement in an arc generally parallel to the direction of vehicle advance.

14. In an apparatus for washing vehicles, brush means for cleaning the surface of a vehicle advancing through the apparatus, said brush means comprising a pair of brush assemblies disposed in spaced relation along the direction of vehicle advance, each said brush assembly having a first link member pivotally supported at one end from said apparatus, a second link member pivotally supported at one end from the other end of said first link member, a brush element supported at the other end of said second link member in vehicle contacting disposition, means for moving one of said link members to provide a component of brush element movement across the rear of said vehicle in an arc generally transverse to the direction of vehicle advance, and means for moving the other of said link members to provide a component of brush element movement across the rear of said vehicle in an arc initially following generally the direction of vehicle advance and ultimately generally transverse to the direction of vehicle advance, said components of brush element movement combining to provide movement of said brush element in cleaning contact across at least a portion of the rear of a vehicle as it advances past said brush assembly, said brush assemblies being disposed transversely opposite with respect to the direction of vehicle advance for combined cleaning contact across the entire rear of the advancing vehicle.

References Cited

UNITED STATES PATENTS

| 3,251,084 | 5/1966 | Larson et al. |
| 3,271,803 | 9/1966 | Cirino et al. |
| 3,292,192 | 12/1966 | Maxwell. |
| 3,310,824 | 3/1967 | Beer. |
| 3,350,733 | 11/1967 | Hanna. |

EDWARD L. ROBERTS, Primary Examiner

U.S. Cl. X.R.

15—53

UNITED STATES PATENT OFFICE
CERTIFICATE OF CORRECTION

Patent No. 3,528,119                    Dated September 15, 1970

Inventor(s) William Fergerson

It is certified that error appears in the above-identified patent and that said Letters Patent are hereby corrected as shown below:

Column 2, line 50, "and", second occurrence, should be -- add --. Column 3, line 16, "fourth" should be -- forth --; line 57, "light" should be -- lights --. Column 5, line 48, "a" should be -- at --; line 49, "theretofore" should be -- where heretofore --. Column 7, line 23, "provide" should be -- provided --.

Signed and sealed this 15th day of December 1970.

(SEAL)
Attest:

EDWARD M. FLETCHER, JR.                 WILLIAM E. SCHUYLER, JR.
Attesting Officer                       Commissioner of Patents